(12) United States Patent
Wu et al.

(10) Patent No.: US 11,708,098 B2
(45) Date of Patent: Jul. 25, 2023

(54) METHOD AND DEVICE FOR OPTIMIZING TARGET OPERATION SPEED CURVE IN ATO OF TRAIN

(71) Applicant: Traffic Control Technology Co., Ltd., Beijing (CN)

(72) Inventors: Ziyu Wu, Beijing (CN); Lei Zhang, Beijing (CN); Wei Wang, Beijing (CN)

(73) Assignee: Traffic Control Technology Co., Ltd., Beijing (CN)

( * ) Notice: Subject to any disclaimer, the term of this patent is extended or adjusted under 35 U.S.C. 154(b) by 345 days.

(21) Appl. No.: 17/160,211

(22) Filed: Jan. 27, 2021

(65) Prior Publication Data

US 2022/0144324 A1     May 12, 2022

(30) Foreign Application Priority Data

Nov. 10, 2020 (CN) .......................... 202011248024.0

(51) Int. Cl.
*B61L 3/00* (2006.01)
*G06F 17/13* (2006.01)
*G06F 18/2111* (2023.01)

(52) U.S. Cl.
CPC .............. *B61L 3/008* (2013.01); *B61L 3/006* (2013.01); *G06F 17/13* (2013.01); *G06F 18/2111* (2023.01)

(58) Field of Classification Search
CPC ...... B61L 3/008; B61L 3/006; G06F 18/2111; G06F 17/13
See application file for complete search history.

(56) References Cited

U.S. PATENT DOCUMENTS 11,390,306 B1 *  7/2022  Yang ...................... G06N 20/00

FOREIGN PATENT DOCUMENTS

| CN | 109815523 A | * | 5/2019 |
| CN | 111191819 A | * | 5/2020 |
| CN | 111291856 A |   | 6/2020 |

OTHER PUBLICATIONS

Xu et al.,"Differential evolution based tuning of fuzzy automatic train operation for mass rapid transit system", 2000, IEE Proceedings: Electric Power Applications (DOI. 10.1049/ip-epa:20000329) (Year: 2000).*

(Continued)

*Primary Examiner* — Tarek Elarabi
(74) *Attorney, Agent, or Firm* — Morriss O'Bryant Compagni Cannon, PLLC

(57) ABSTRACT

Embodiments of the present application provide a method and a device for optimizing a target operation speed curve in an ATO of a train. The method includes: calculating a plurality of performance indexes of the train driving in a current section of a line, and constructing an objective function for optimizing the target operation speed curve of the train according to the plurality of performance indexes; determining constraint conditions of the objective function according to speed limit information of the line and running time of the train in the current section; and solving the objective function according to the constraint conditions based on a differential evolution algorithm to obtain the target operation speed curve of the train. The objective function for optimizing the target operation speed curve of the train are constructed using the plurality of performance indexes, which makes the optimization of the train speed curve more accurate.

20 Claims, 4 Drawing Sheets

(56) References Cited

OTHER PUBLICATIONS

Shang C S et al: "Differential evolution based tuning of fuzzy automatic train operation for mass rapid transit system", IEE Proceedings: Electric Power Applications, Institution of Electrical Engineers, GB, vol. 147, No. 3, May 11, 2000 (May 11, 2000), pp. 206-212.

Liang Yanchu et al: "A Modified Genetic Algorithm for Multi-Objective Optimization on Running Curve of Automatic Train Operation System Using Penalty Function Method", International Journal of Intelligent Transportation Systems Research, Springer US, Boston, vol. 17, No. 1, May 22, 2018 (May 22, 2018 ), pp. 74-87.

* cited by examiner

METHOD AND DEVICE FOR OPTIMIZING TARGET OPERATION SPEED CURVE IN ATO OF TRAIN

CROSS-REFERENCE TO RELATED APPLICATION

The present application claims priority to Chinese Application No. 202011248024.0 filed on Nov. 10, 2020, entitled "Method and Device for Optimizing Target Operation Speed Curve in ATO of Train," which is hereby incorporated by reference in its entirety.

FIELD OF TECHNOLOGY

The present application relates to the technical field of train operation control, in particular to a method and a device for optimizing target operation speed curve in ATO of train.

BACKGROUND

The train runs back and forth based on a determined train schedule on a fixed line and excellent train operation performance may be obtained by optimizing the automatic operation strategy of the ATO (Automatic Train Operation).

In terms of optimization of train operation speed curve, the Pontryagin maximum principle is currently adopted to analyze and prove that the optimal driving strategy of the train consists of four types of working conditions: maximum traction, cruising, coasting and maximum braking through the establishment of a continuous energy-saving manipulation model. A speed curve and a conversion point equation of the optimal working condition sequence are obtained using the maximum value principle, and the numerical value is solved and analyzed. In the related art, the energy-saving manipulation problem of multi-gradient lines is studied to design and solve using the minimum principle, so as to get an energy-saving operation curve of the line. There is also a distance-based train speed curve search model, and an optimal speed profile is found out using an ant colony algorithm, a genetic algorithm and a dynamic programming algorithm. Optimization is carried out using artificial neural networks to obtain an optimal coasting point of the train, so that the train has the minimum energy consumption.

In traditional methods for optimizing a target operation speed curve in an ATO of a train, train operation energy consumption is mostly optimized as a single target, resulting in inaccurate optimization results. As for the solution algorithm, a genetic algorithm or particle swarm algorithm is mostly adopted to optimize and solve the train speed curve, which has the disadvantages such as complicated solution process, heavy computation and being easy to cause local optimum or non-convergence.

SUMMARY

The embodiments of the present application provide a method and a device for optimizing a target operation speed curve in an ATO (Automatic Train Operation) of a train, which is capable of overcoming the defects of inaccurate optimization of the train speed curve and heavy calculation amount in the related art, and providing the rapid and accurate optimization of the train speed curve.

The embodiment of the present application provides a method for optimizing a target operation speed curve in an ATO system of a train, including:

calculating a plurality of performance indexes of the train driving in a current section of a line, and constructing an objective function for optimizing the target operation speed curve of the train according to the plurality of performance indexes;

determining constraint conditions of the objective function according to speed limit information of the line and running time of the train in the current section; and solving the objective function according to the constraint conditions based on a differential evolution algorithm to obtain the target operation speed curve of the train.

In the method for optimizing a target operation speed curve in an ATO of a train according to an embodiment of the present application, the plurality of performance indexes include a running energy consumption index and a comfort index when a current passenger volume of the line is less than a preset threshold;

the plurality of performance indexes include a punctuality index and the comfort index when the current passenger volume of the line is equal to or greater than the preset threshold;

In an embodiment, the running energy consumption index reflects an energy consumption when the train runs;

the comfort index is measured by an impact rate of acceleration when the train runs; and the punctuality index reflects an arrival punctuality of the train.

In the method for optimizing a target operation speed curve in an ATO of a train according to an embodiment of the present application, the calculating a plurality of performance indexes of the train driving in a current section of a line includes:

obtaining the running time of the train in the current section from the running timetable of the train;

dividing the running time into a plurality of time steps, and obtaining a displacement of the train at each time step according to an average speed of the train at each time step;

obtaining the running energy consumption index of the train in the current section according to the displacement and traction force of the train at each time step;

obtaining the punctuality index of the train in the current section according to the displacement, an acceleration, the average speed of the train at each time step and the running time of the train in the current section; and obtaining the comfort index of the train in the current section according to the acceleration and time of the train at each time step.

In the method for optimizing a target operation speed curve in an ATO of a train according to an embodiment of the present application, the running energy consumption index of the train in the current section is obtained according to the displacement and traction force of the train at each time step by the following equation:

$$E_1 = \sum_{i=1}^{T} F_i s_i$$

where $E_1$ is the running energy consumption index of the train in the current section, T is the number of the time steps, $F_i$ is the traction force of the train at the i-th time step, and $s_i$ is the displacement of the train at the i-th time step.

The punctuality index of the train in the current section is obtained according to the displacement, an acceleration, the average speed of the train at each time step and the running time of the train in the current section by the following equation:

$$E_2 = \sum_{i=1}^{T} \left[ \left( \sqrt{2a_i(s_{i+1} - s_i) + v_i^2} - v_i \right) / a_i \right] - t_0$$

where $E_2$ is the punctuality index of the train in the current section, $a_i$ is the acceleration of the train at the i-th time step, $s_{i+1}$ is the displacement of the train at the i+1-th time step, and $v_i$ is the average speed of the train at the i-th time step, and $t_0$ is the running time of the train in the current section in the running timetable;

The comfort index of the train in the current section is obtained according to the acceleration and time of the train at each time step by the following equation:

$$E_3 = \sum_{i=1}^{T} \frac{|a_i - a_{i-1}|}{\Delta t_i}$$

where $E_3$ is the comfort index of the train in the current section, $a_{i-1}$ is the acceleration of the train at the i−1-th time step, and $\Delta t_i$ is the time at the i-th time step.

In the method for optimizing a target operation speed curve in an ATO of a train according to an embodiment of the present application, the constructing an objective function for optimizing the target operation speed curve of the train according to the plurality of performance indexes includes:

constructing the following objective function $J_1$ when the current passenger volume of the line is less than the preset threshold:

$J_1 = \min(w_1 E_1 + w_2 E_3)$ where $J_1$ represents the objective function, $E_1$ is the running energy consumption index of the train in the current section, $E_3$ is the comfort index of the train in the current section, and $w_1$ and $w_2$ are the weight of the running energy consumption index and the weight of the comfort index, respectively; and constructing the following objective function $J_2$ when the current passenger volume of the line is equal to or greater than the preset threshold:

$J_2 = \min(w_3 E_2 + w_4 E_3)$ where $J_2$ represents the objective function, $E_2$ is the punctuality index of the train in the current section, $E_3$ is the comfort index of the train in the current section, and $w_3$ and $w_4$ are the weight of the punctuality index and the weight of the comfort index, respectively.

In the method for optimizing the target operation speed curve in the ATO of the train according to an embodiment of the present application, the determining constraint conditions of the objective functions according to speed limit information of the line and running time of the train in the current section includes:

querying a speed limit value of the current section from the speed limit information of the line, and determining that the constraint condition of the objective function is that the target operation speed curve of the train running in the current section is less than the speed limit value; and obtaining the running time of the train in the current section from the running timetable of the train, and deter-mining that the constraint condition of the objective function is that the running time of the train in the current section according to the target operation speed curve is less than the product of the running time of the train in the current section in the running timetable and a preset multiple.

In the method for optimizing a target operation speed curve in an ATO of a train according to an embodiment of the present application, after the solving the objective functions according to the constraint conditions based on a differential evolution algorithm to obtain the target operation speed curve of the train, the method further includes:

issuing the obtained target operation speed curve of the train to the ATO of the train, so that the ATO of the train controls the train to run in the current section according to the target operation speed curve.

The embodiment of the present application also provides a device for optimizing a target operation speed curve in an ATO (Automatic Train Operation) of a train, including:

a constructor configured to calculate a plurality of performance indexes of the train driving in a current section of a line, and construct an objective function for optimizing the target operation speed curve of the train according to the plurality of performance indexes;

a determiner configured to determine constraint conditions of the objective function according to speed limit information of the line and running time of the train in the current section; and a solver configured to solve the objective function according to the constraint conditions based on a differential evolution algorithm to obtain the target operation speed curve of the train.

An embodiment of the present application also provides an electronic device, including a memory, a processor, and computer programs stored in the memory and executable by the processor, the processor is configured to implement steps of the method for optimizing a target operation speed curve in an ATO of a train mentioned above when executing the computer programs.

An embodiment of the present application also provides a computer-readable storage medium, in which computer programs are stored, and the computer programs are executed by a processor to implement steps of the method for optimizing a target operation speed curve in an ATO of a train mentioned above.

The method for optimizing a target operation speed curve in an ATO of a train according to the present application includes: constructing an objective function according to a plurality of performance indexes of the train driving in a current section of a line; determining constraint conditions of the objective function according to speed limit information of the line and running time of the train in the current section; and solving the objective function according to the constraint conditions based on a differential evolution algorithm to obtain the target operation speed curve of the train. On the one hand, the objective function for optimizing the target operation speed curve of the train are constructed using the plurality of performance indexes, which makes the optimization of the train speed curve more accurate. On the other hand, the optimization problem of the operation curve is solved based on the differential evolution algorithm, which does not need to generate the next generation of solution members using probability distribution and solves the problems of being easy to cause local optimum and slow convergence in the genetic algorithm.

BRIEF DESCRIPTION OF THE DRAWINGS

In order to more clearly illustrate the technical solutions disclosed in the embodiments of the present application or the related art, drawings needed in the descriptions of the embodiments or the related art will be briefly described below. Obviously, the drawings in the following description are only some of the embodiments of the present application, and other drawings can be obtained according to these drawings without any creative effort for those skilled in the art.

DETAILED DESCRIPTION

In order to give clear illustration of the objectives, technical solutions and advantages of the embodiments of the present application, the technical solutions in the embodiments of the present application will be described clearly and completely in conjunction with the accompanying drawings in the embodiments of the present application. Obviously, the described embodiments are part of the embodiments of the present application, rather than all of the embodiments. All other embodiments obtained by a person of ordinary skill in the art based on the embodiments of the present application without any creative effort fall within the protection scope of the present application.

Figure 1:
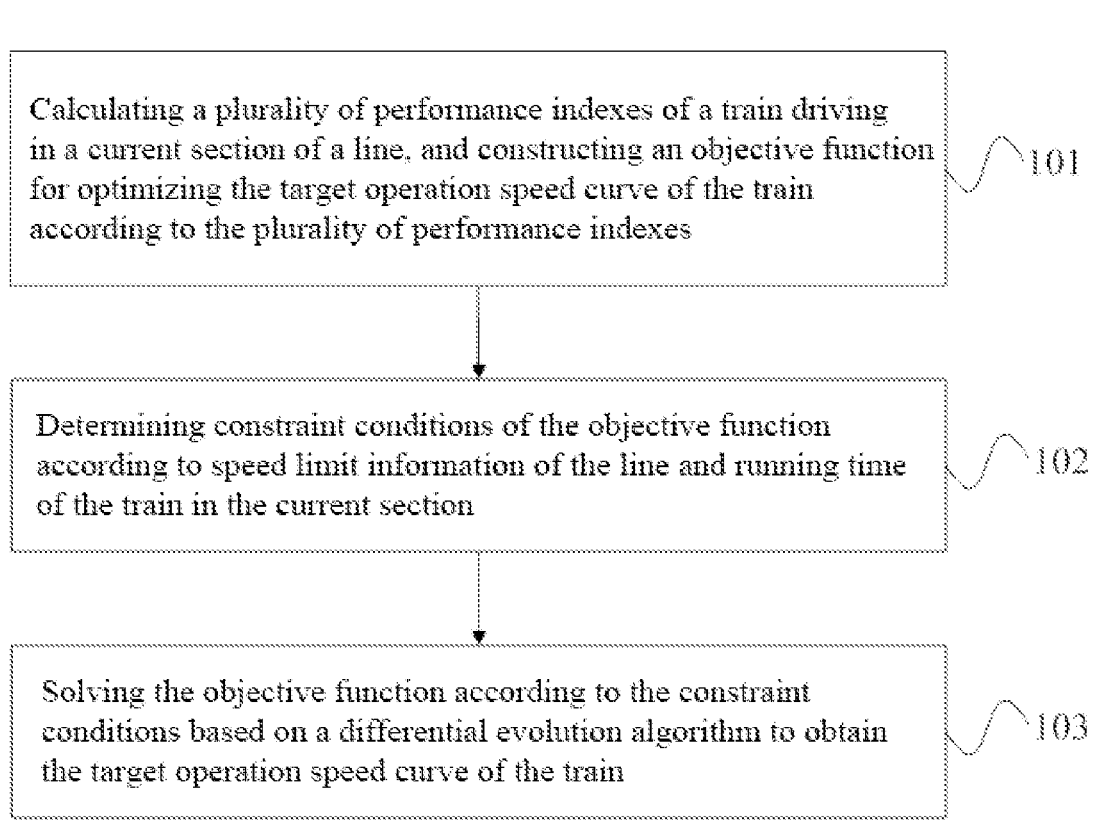
FIG. 1 is a schematic flowchart of a method for optimizing a target operation speed curve in an ATO of a train according to an embodiment of the present application.

A method for optimizing a target operation speed curve in an ATO (Automatic Train Operation) of a train according to an embodiment of the present application will be described below in conjunction with FIG. 1. The method includes:

Step 101: calculating a plurality of performance indexes of the train driving in a current section of a line, and constructing an objective function for optimizing the target operation speed curve of the train according to the plurality of performance indexes;

where the current section at which the train runs is a section between two adjacent stations. The plurality of performance indexes, such as energy consumption saving, punctual operation and ride comfort of the train driving in the current section are calculated. Each performance index is related to the target operation speed of the train. The plurality of performance indexes are adopted to construct the objective function, for example, the plurality of performance indexes are weighted and summed to obtain the objective function and thus the correlation between the objective function and the target operation speed of the train is constructed.

Step 102: determining constraint conditions of the objective function according to speed limit information of the line and running time of the train in the current section.

The operation of the train needs to meet the basic operational requirements for safety and punctuality. Therefore, the speed of the train needs to meet the speed limit requirements of the line to ensure the safe operation of the train when the target operation speed curve is planned. The train also needs to run according to the running time on the running timetable, otherwise it will cause the train to be delayed, shorten the time for passenger boarding and landing operations, and reduce the quality of service. In this embodiment, constraint conditions are constructed according to the basic operational requirements of the train, based on the read-in train performance parameters, speed limit information of the line, and running timetable information.

Step 103: solving the objective function according to the constraint conditions based on a differential evolution algorithm to obtain the target operation speed curve of the train.

Figure 2:
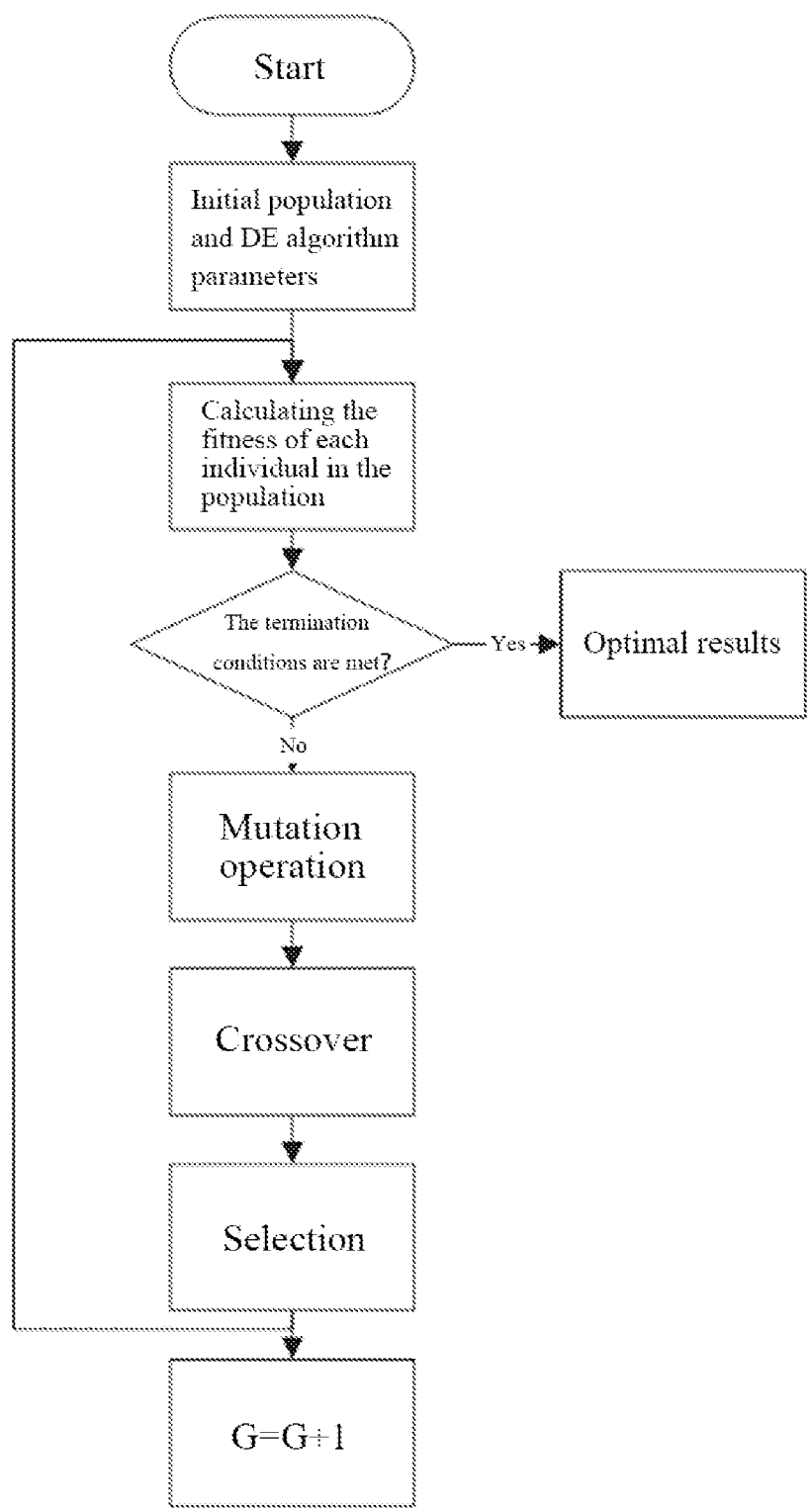
FIG. 2 is a flowchart of a differential evolution algorithm in a method for optimizing a target operation speed curve in an ATO of a train according to an embodiment of the present application.

In this embodiment, the differential evolution algorithm is adopted to solve the optimization of the target operation speed curve of the train. The differential evolution algorithm includes mutation and crossover operations and elimination mechanism and is a greedy genetic algorithm based on real number encoding for ensuring quality. The difference between the differential evolution algorithm and the traditional genetic algorithm is that the former does not need to generate the next generation of solution members using probability distribution and solves the problems of local optimum and low convergence in the genetic algorithm. The flowchart of the differential evolution algorithm is shown in FIG. 2.

The method for optimizing a target operation speed curve in an ATO of a train according to the present application includes: constructing an objective function according to a plurality of performance indexes of the train driving in a current section of a line; determining constraint conditions of the objective function according to speed limit information of the line and running time of the train in the current section; and solving the objective function according to the constraint conditions based on a differential evolution algorithm to obtain the target operation speed curve of the train. On the one hand, the objective function for optimizing the target operation speed curve of the train are constructed using the plurality of performance indexes, which makes the optimization of the train speed curve more accurate. On the other hand, the optimization problem of the operation curve is solved based on the differential evolution algorithm, which does not need to generate the next generation of solution members using probability distribution and may solves the problem of being easy to cause local optimum and slow convergence in the genetic algorithm.

On the basis of the foregoing embodiment, in an embodiment, the plurality of performance indexes include a running energy consumption index and a comfort index when the current passenger volume of the line is less than a preset threshold; the plurality of performance indexes include a punctuality index and the comfort index when the current passenger volume of the line is equal to or greater than the preset threshold; where the running energy consumption index reflects an energy consumption when the train runs; the comfort index is measured by an impact rate of acceleration when the train runs; and the punctuality index reflects an arrival punctuality of the train.

When the current passenger volume is less than a preset threshold, it indicates that the passenger volume is at an off-peak, and the operational requirements mainly focus on energy efficiency. The objective function is constructed with the goal of reducing running energy consumption and improving comfort as evaluation indexes. During off-peak hours, the inter-station running time is regarded as a constraint, rather than an optimization objective. In this way, more energy consumption can be saved under the constraint of no delay based on the solved curve, and the optimized objective function is more reasonable than the general method.

When the current passenger volume is equal to or greater than the preset threshold, it means that the passenger volume is at a peak, the operational requirements mainly focus on increase of transport capacity, and the objective function is constructed with the goal of shortening the running time of the train at a section and improving the comfort.

The method in this embodiment may dynamically adjust the optimized objective function according to passenger volume conditions and operating requirements, so that the target operation speed curve can better meet passengers' travel needs and improve service quality while reduce running energy consumption.

On the basis of the foregoing embodiments, in the method for optimizing the target operation speed curve in an ATO of a train according to an embodiment of the present application, the calculating the plurality of performance indexes of the train driving in the current section of the line includes: obtaining the running time of the train in the current section from a running timetable of the train; dividing the running time into a plurality of time steps, and obtaining a displacement of the train at each time step according to an average speed of the train at each time step.

Because the section movement process of the train is a complex and non-linear process, it is difficult to directly calculate the energy consumption, comfort, punctuality and other indexes during the running of the train by mathematical equations. Therefore, the inter-station running process of the train is divided into T linearly variable segments for mathematical description, and each segment is a time step dt, then the train operation curve may be approximately expressed as:

$$s = \sum_{i=1}^{T} V_i dt$$

where dt is the time step, $V_i$ is the average speed at the i-th time step, and s is the total inter-station distance. At each time step, the plurality of performance index values of the train are calculated and summed to obtain the index values of the entire inter-station operation of the train.

The running energy consumption index of the train in the current section is obtained according to the displacement and traction force of the train at each time step; the punctuality index of the train in the current section is obtained according to the displacement, an acceleration, the average speed of the train at each time step and the running time of the train in the current section; and the comfort index of the train in the current section is obtained according to the acceleration and time of the train at each time step.

In this embodiment, the running energy consumption index of the train is obtained according to the traction and running displacement of the train regardless of the energy feedback when the train is braking. The punctuality index is obtained according to the difference between the actual inter-station running time of the train and the inter-station running time specified in the timetable. The comfort index is measured by the impact rate of acceleration.

On the basis of the foregoing embodiment, in this embodiment, the running energy consumption index of the train in the current section is obtained according to the displacement and traction force of the train at each time step by the following equation:

$$E_1 = \sum_{i=1}^{T} F_i s_i$$

where $E_1$ is the running energy consumption index of the train in the current section, T is the number of the time steps, $F_i$ is the traction force of the train at the i-th time step, and $s_i$ is the displacement of the train at the i-th time step.

The punctuality index of the train in the current section is obtained according to the displacement, an acceleration, the average speed of the train at each time step and the running time of the train in the current section by the following equation:

$$E_2 = \sum_{i=1}^{T} \left[ \left( \sqrt{2a_i(s_{i+1} - s_i) + v_i^2} - v_i \right) / a_i \right] - t_0$$

where $E_2$ is the punctuality index of the train in the current section, $a_i$ is the acceleration of the train at the i-th time step, $s_{i+1}$ is the displacement of the train at the i+1-th time step, and $v_i$ is the average speed of the train at the i-th time step, and $t_0$ is the running time of the train in the current section in the running timetable;

The comfort index of the train in the current section is obtained according to the acceleration and time of the train at each time step by the following equation:

$$E_3 = \sum_{i=1}^{T} \frac{|a_i - a_{i-1}|}{\Delta t_i}$$

where $E_3$ is the comfort index of the train in the current section, $a_{i-1}$ is the acceleration of the train at the i−1-th time step, and $\Delta t_i$ is the time at the i-th time step.

On the basis of the foregoing embodiments, in an embodiment, the constructing an objective function for optimizing the target operation speed curve of the train according to the plurality of performance indexes includes: constructing the following objective function $J_1$ when the current passenger volume of the line is less than the preset threshold:

$$J_1 = \min(w_1 E_1 + w_2 E_3)$$

where $J_1$ represents the objective function, $E_1$ is the running energy consumption index of the train in the current section, $E_3$ is the comfort index of the train in the current section, and $w_1$ and $w_2$ are the weight of the running energy consumption index and the weight of the comfort index, respectively; and constructing the following objective function $J_2$ when the current passenger volume of the line is equal to or greater than the preset threshold:

$$J_2 = \min(w_3 E_2 + w_4 E_3)$$

where $J_2$ represents the objective function, $E_2$ is the punctuality index of the train in the current section, $E_3$ is the comfort index of the train in the current section, and $w_3$ and $w_4$ are the weight of the punctuality index and the weight of the comfort index, respectively.

On the basis of the foregoing embodiments, in an embodiment, the determining constraint conditions of the objective functions according to speed limit information of the line and running time of the train in the current section includes: querying a speed limit value of the current section from the speed limit information of the line, and determining that the constraint condition of the objective function is that the target operation speed curve of the train running in the current section is less than the speed limit value; and obtaining the running time of the train in the current section from the running timetable of the train, and determining that the constraint condition of the objective function is that the running time of the train in the current section according to the target operation speed curve is less than the product of the running time of the train in the current section in the running timetable and a preset multiple.

Figure 3:
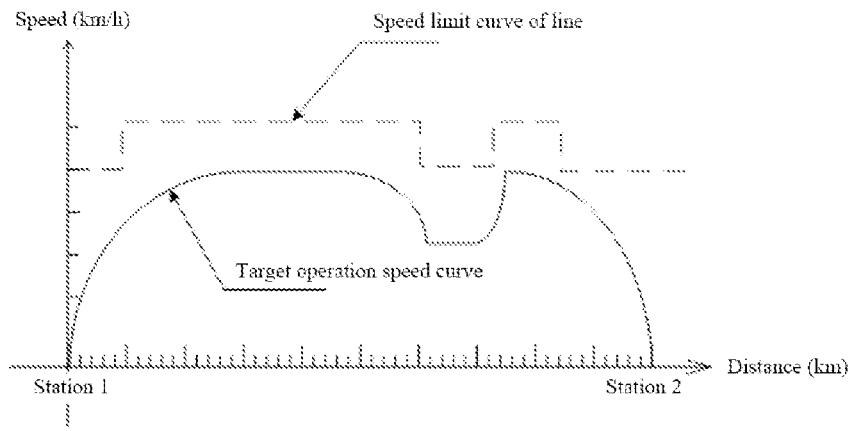
FIG. 3 is a schematic flowchart of a target speed curve of an ATO in a method for optimizing a target operation speed curve in an ATO of a train according to an embodiment of the present application.

The train needs to meet the basic operational requirements of safety and punctuality and thus it is necessary to ensure that the speed of the train is lower than a speed limit of the line, as shown in FIG. 3, so as to meet the safety requirements of train operation when the target speed curve is planned. At the same time, trains need to run according to the timetable, and the inter-station running time cannot exceed the preset multiple such as 1.05 times of that in the timetable, otherwise it will cause the train to be delayed, shorten the time for passenger boarding and landing operation, and reduce the quality of service.

Constraint 1: the planned target speed is less than a speed limit of the line, which can be expressed as:

$$v(s) < v\text{line}(s)$$

where $v(s)$ is the target operation speed curve to be planned, and $v\text{line}(s)$ is the speed limit value of the line read from the electronic map of the line.

Constraint 2: the inter-station running time does not exceed 1.05 times the running time specified in the timetable, which can be expressed as:

$$t < t_0 \times 1.05$$

where t is the inter-station running time when the train runs according to the target speed curve, and $t_0$ is the inter-station running time specified in the timetable.

This embodiment satisfies environmental constraints such as the speed limit of the line, as well as train system characteristic constraints such as train traction and braking capabilities, reasonably plans the operation curve in the entire line, and can meet the safety requirements of train operation.

On the basis of the foregoing embodiments, after the solving the objective function according to the constraint conditions based on a differential evolution algorithm to obtain the target operation speed curve of the train, the method further includes: issuing the obtained target operation speed curve of the train to the ATO of the train, so that the ATO of the train controls the train to run in the current section according to the target operation speed curve.

The solved target operation speed curve is issued to the ATO, and the ATO controls the train to complete the inter-station operation according to the curve. After the train arrives at the next station, the steps of optimizing the target operation speed curve of the train are repeated during the stop, and the target operation speed curve for the next station will be planned and executed.

Figure 4:
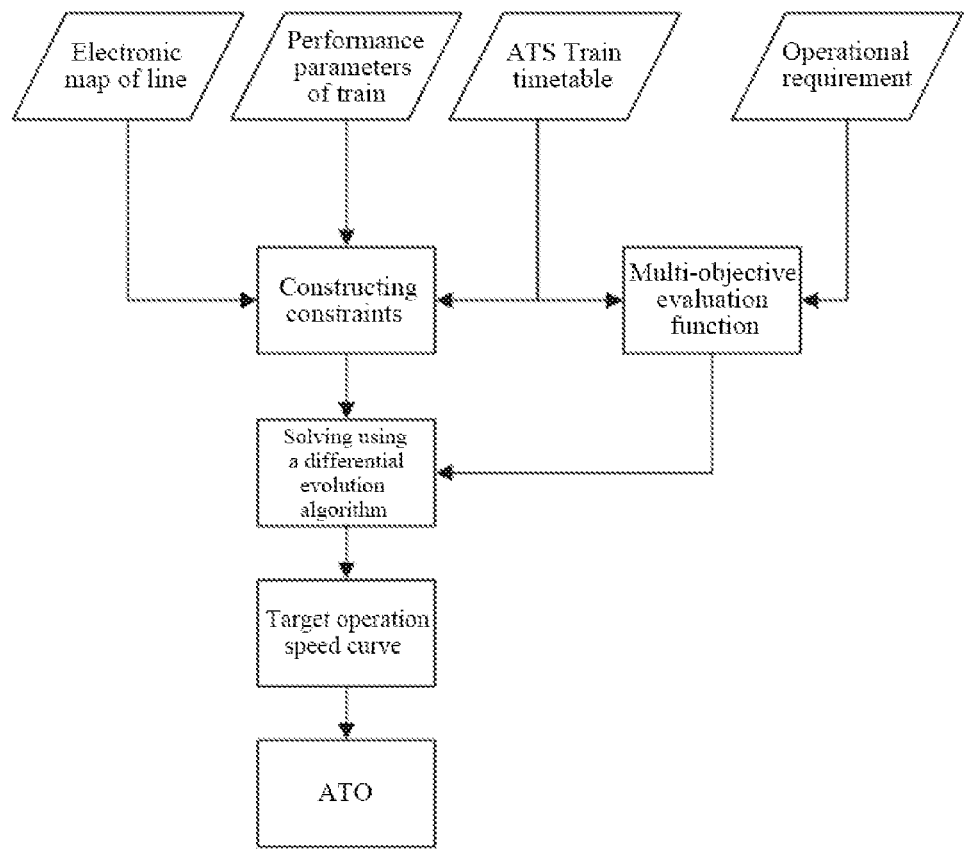
FIG. 4 is a complete schematic flowchart of a method for optimizing a target operation speed curve in an ATO of a train according to an embodiment of the present application.

As shown in FIG. 4, the method for multi-objective optimization of train operation curve based on the differential evolution method in this embodiment includes the following steps:

step 1, reading in data: reading information about the line, the train, the train timetable and the operational requirements;

step 2, constructing constraints: constructing constraint conditions for optimizing the target operation curve according to the read-in performance parameters of the train, speed limit information of the line and train timetable information; and step 3, solving evaluation indexes and constructing objective functions to be optimized: calculating corresponding evaluation indexes and constructing the objective functions according to the operational requirements. During the off-peak hours, the operational requirements mainly focus on energy efficiency and the objective function is constructed with the goal of reducing running energy consumption and improving comfort as evaluation indexes. During the peak hours, the operational requirements mainly focus on increase of transport capacity, and the objective function is constructed with the goal of shortening the running time of the train at a section and improving the comfort.

Step 4, solving the target operation speed curve: solving the multi-objective optimization problem constructed in steps 2 and 3 using a differential evolution algorithm to obtain the target operation speed curve.

Step 5, issuing the curve to the ATO and executing: issuing the solved target operation speed curve to the ATO, and allowing the ATO to control the train to complete the inter-station operation according to the curve. After the train arrives at the next station, the steps 1 to 5 are repeated during the stop, and the target operation speed curve for the next station will be planned and executed.

A device for optimizing a target operation speed curve in the ATO of a train according to an embodiment of the present application will be described hereinafter and the device for optimizing a target operation speed curve in an ATO of a train and the method for optimizing a target operation speed curve in an ATO of a train described above may be referred to each other.

Figure 5:
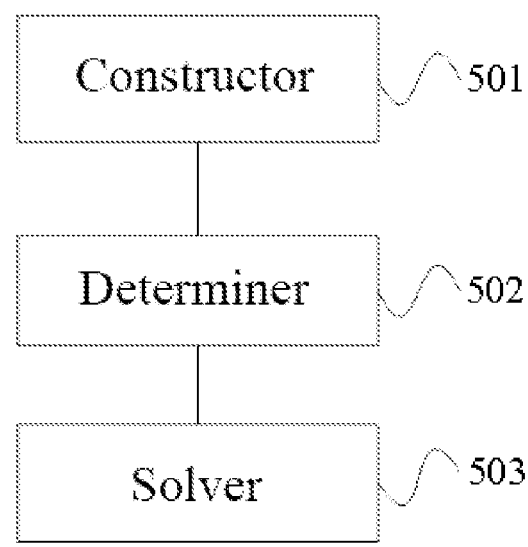
FIG. 5 is a schematic structural diagram of a device for optimizing a target operation speed curve in an ATO of a train according to an embodiment of the present application.

As shown in FIG. 5, the device includes a constructor 501, a determiner 502, and a solver 503, where:

the constructor 501 is configured to calculate a plurality of performance indexes of the train driving in a current section of a line, and constructing an objective function for optimizing the target operation speed curve of the train according to the plurality of performance indexes;

where the current section at which the train runs is a section between two adjacent stations. The plurality of performance indexes, such as energy consumption saving, punctual operation and ride comfort of the train driving in the current section are calculated. Each performance index is related to the target operation speed of the train. The plurality of performance indexes are adopted to construct the objective functions, for example, the plurality of performance indexes are weighted and summed to obtain the objective function and thus the correlation between the objective functions and the target operation speed of the train are constructed.

The determiner 502 is configured to determine constraint conditions of the objective function according to speed limit information of the line and running time of the train in the current section.

The operation of the train needs to meet the basic operational requirements for safety and punctuality. Therefore, the speed of the train needs to meet the speed limit requirements of the line to ensure the safe operation of the train when the target operation speed curve is planned. The train also needs to run according to the operation time in the running timetable, otherwise it will cause the train to be delayed, shorten the time for passenger boarding and landing operations, and reduce the quality of service. In this embodiment, constraint conditions are constructed according to the basic operational requirements of the train, based on the read-in train performance parameters, speed limit information of the line, and running timetable information.

The solver 503 is configured to solve the objective function according to the constraint conditions based on a differential evolution algorithm to obtain the target operation speed curve of the train.

In this embodiment, the differential evolution algorithm is adopted to solve the optimization of the target operation speed curve of the train. The differential evolution algorithm includes mutation and crossover operations and elimination mechanism and is a greedy genetic algorithm based on real number encoding for ensuring quality. The difference between the differential evolution algorithm and the traditional genetic algorithm is that the former does not need to generate the next generation of solution members using probability distribution and solves the problems of being easy to cause local optimum and slow convergence in the genetic algorithm.

The method for optimizing a target operation speed curve in an ATO of a train according to the present application includes: constructing an objective function according to a plurality of performance indexes of the train driving in a current section of a line; determining constraint conditions of the objective function according to speed limit information of the line and running time of the train in the current section; and solving the objective function according to the constraint conditions based on a differential evolution algorithm to obtain the target operation speed curve of the train. On the one hand, the objective function for optimizing the target operation speed curve of the train are constructed using the plurality of performance indexes, which makes the optimization of the train speed curve more accurate. On the other hand, the optimization problem of the operation curve is solved based on the differential evolution algorithm, which does not need to generate the next generation of solution members using probability distribution and may solves the problems of being easy to cause local optimum and slow convergence in the genetic algorithm.

On the basis of the foregoing embodiment, in an embodiment, the plurality of performance indexes include a running energy consumption index and a comfort index when a current passenger volume of the line is less than a preset threshold; and the plurality of performance indexes include a punctuality index and the comfort index when the current passenger volume of the line is equal to or greater than the preset threshold; wherein the running energy consumption index reflects an energy consumption when the train runs; the comfort index is measured by an impact rate of acceleration when the train runs; and the punctuality index reflects an arrival punctuality of the train.

On the basis of the foregoing embodiments, the constructor in this embodiment is configured to obtain the running time of the train in the current section from a running timetable of the train; divide the running time into a plurality of time steps, and obtain a displacement of the train at each time step according to an average speed of the train at each time step; obtain the running energy consumption index of the train in the current section according to the displacement and traction force of the train at each time step; obtain the punctuality index of the train in the current section according to the displacement, an acceleration, the average speed of the train at each time step and the running time of the train in the current section; and obtain the comfort index of the train in the current section according to the acceleration and time of the train at each time step.

On the basis of the foregoing embodiments, the constructor in this embodiment is configured to obtain the running energy consumption index of the train in the current section according to the displacement and traction force of the train at each time step by the following equation:

$$E_1 = \sum_{i=1}^{T} F_i s_i$$

where $E_1$ is the running energy consumption index of the train in the current section, T is the number of the time steps, $F_i$ is the traction force of the train at the i-th time step, and $s_i$ is the displacement of the train at the i-th time step.

The constructor in this embodiment is configured to obtain the punctuality index of the train in the current section according to the displacement, an acceleration, the average speed of the train at each time step and the running time of the train in the current section by the following equation:

$$E_2 = \sum_{i=1}^{T} \left[ \left( \sqrt{2a_i(s_{i+1} - s_i) + v_i^2} - v_i \right) / a_i \right] - t_0$$

where $E_2$ is the punctuality index of the train in the current section, $a_i$ is the acceleration of the train at the i-th time step, $s_{i+1}$ is the displacement of the train at the i+1-th time step, and $v_i$ is the average speed of the train in i-th time step, and $t_0$ is the running time of the train in the current section in the running timetable;

The constructor in this embodiment is configured to obtain the comfort index of the train in the current section according to the acceleration and time of the train at each time step by the following equation:

$$E_3 = \sum_{i=1}^{T} \frac{|a_i - a_{i-1}|}{\Delta t_i}$$

where $E_3$ is the comfort index of the train in the current section, $a_{i-1}$ is the acceleration of the train at the i−1-th time step, and $\Delta t_i$ is the time at the i-th time step.

On the basis of the foregoing embodiments, the constructor in this embodiment is configured to construct the following objective function $J_1$ when the current passenger volume of the line is less than the preset threshold:

$$J_1 = \min(w_1 E_1 + w_2 E_3)$$

where $J_1$ represents the objective function, $E_1$ is the running energy consumption index of the train in the current section, $E_3$ is the comfort index of the train in the current section, and $w_1$ and $w_2$ are the weight of the running energy consumption index and the weight of the comfort index, respectively; and the constructor in this embodiment is configured to construct the following objective function $J_2$ when the current passenger volume of the line is equal to or greater than the preset threshold:

$$J_2 = \min(w_3 E_2 + w_4 E_3)$$

where $J_2$ represents the objective function, $E_2$ is the punctuality index of the train in the current section, $E_3$ is the comfort index of the train in the current section, and $w_3$ and $w_4$ are the weight of the punctuality index and the weight of the comfort index, respectively.

On the basis of the foregoing embodiments, the determiner in this embodiment is configured to query a speed limit value of the current section from the speed limit information of the line, and determine that the constraint condition of the objective function is that the target operation speed curve of the train running in the current section is less than the speed limit value; and obtain the running time of the train in the current section from the running timetable of the train, and determine that the constraint condition of the objective function is that the running time of the train in the current section according to the target operation speed curve is less than the product of the running time of the train in the current section in the running timetable and a preset multiple.

On the basis of the foregoing embodiments, the device in this embodiment further includes an issuer configured to issue the obtained target operation speed curve of the train to the ATO of the train, so that the ATO of the train controls the train to run in the current section according to the target operation speed curve.

Figure 6:
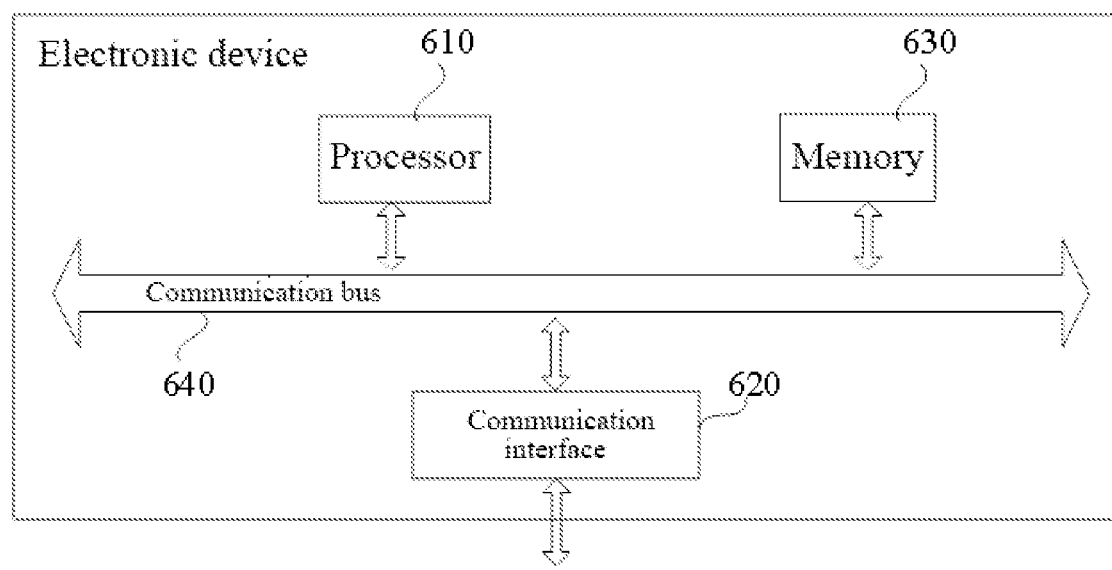
FIG. 6 is a schematic structural diagram of an electronic device according to an embodiment of the present application.

FIG. 6 is a schematic diagram of the physical structure of an electronic device. As shown in FIG. 6, the electronic device may include: a processor 610, a communication interface 620, a memory 630, and a communication bus 640. The processor 610, the communication interface 620, and the memory 630 communicate with each other through the communication bus 640. The processor 610 may call logic instructions in the memory 630 to execute the method for optimizing a target operation speed curve in an ATO of a train. The method includes: calculating a plurality of performance indexes of the train driving in a current section of a line, and constructing an objective function for optimizing the target operation speed curve of the train according to the plurality of performance indexes; determining constraint conditions of the objective function according to speed limit information of the line and running time of the train in the current section; and solving the objective function according to the constraint conditions based on a differential evolution algorithm to obtain the target operation speed curve of the train.

In addition, the logic instructions in the memory 630 described above may be implemented in the form of a software functional unit and may be stored in a computer readable storage medium while being sold or used as a separate product. Based on such understanding, the technical solution of the present application or a part of the technical solution, which is essential or contributes to the related art, may be embodied in the form of a software product, which is stored in a storage medium, including several instructions to cause a computer device (which may be a personal computer, server, or network device, etc.) to perform all or part of the steps of the methods described in various embodiments of the present application. The storage medium described above includes: a U disk, a mobile hard disk, a read-only memory (ROM), a random access memory (RAM), a magnetic disk, or an compact disk, and the like.

On the another hand, an embodiment of the present application also provides a computer program product, the computer program product includes computer programs stored on a non-transitory computer-readable storage medium, the computer program includes program instructions, when executed by a computer, causing the computer to execute the method for optimizing a target operation speed curve in an ATO of a train. The method includes: calculating a plurality of performance indexes of the train driving in a current section of a line, and constructing an objective function for optimizing the target operation speed curve of the train according to the plurality of performance indexes; determining constraint conditions of the objective function according to speed limit information of the line and running time of the train in the current section; and solving the objective function according to the constraint conditions based on a differential evolution algorithm to obtain the target operation speed curve of the train.

On yet another hand, an embodiment of the present application also provides a non-transitory computer-readable storage medium storing computer programs, when executed by a computer, causing a computer to execute the method for optimizing a target operation speed curve in an ATO of a train. The method includes: calculating a plurality of performance indexes of the train driving in a current section of a line, and constructing an objective function for optimizing the target operation speed curve of the train according to the plurality of performance indexes; determining constraint conditions of the objective function according to speed limit information of the line and running time of the train in the current section; and solving the objective function according to the constraint conditions based on a differential evolution algorithm to obtain the target operation speed curve of the train.

The device embodiments described above are merely illustrative, wherein the units described as separate components may or may not be physically separate, and the components displayed as units may or may not be physical units, that is, may be located at the same place, or may be distributed to multiple network units. Some or all of the modules may be selected according to actual needs to achieve the purpose of the solution of the embodiments. Those of ordinary skill in the art can understand and implement the embodiments described above without paying creative labors.

Through the description of the embodiments above, those skilled in the art can clearly understand that the various embodiments can be implemented by means of software and a necessary general hardware platform, and of course, by hardware. Based on such understanding, the technical solution of the present application or a part of the technical solution, which is essential or contributes to the related art, may be embodied in the form of a software product, which is stored in a storage medium such as ROM/RAM, magnetic discs, compact discs, etc., including several instructions to cause a computer device (which may be a personal computer, server, or network device, etc.) to perform various embodiments or a part of the methods described in various embodiments.

Finally, it should be noted that the above embodiments are only used to explain the technical solutions of the present application, and are not limited thereto; although the present application is described in detail with reference to the foregoing embodiments, it should be understood by those skilled in the art that they can still modify the technical solutions described in the foregoing embodiments and make equivalent substitutions to a part of the technical features, and these modifications and substitutions do not depart from the spirit and scope of the technical solutions of the embodiments of the present application.

The invention claimed is:

1. A method for optimizing a target operation speed curve in an Automatic Train Operation (ATO) of a train, comprising:

obtaining a running time of the train in a current section of a line from a running timetable of the train;

dividing the running time into a plurality of time steps and obtaining a displacement of the train at each time step according to an average speed of the train at each time step;

calculating a plurality of performance indexes of the train driving in the current section of the line, and constructing an objective function for optimizing the target operation speed curve of the train according to the plurality of performance indexes, comprising:

obtaining a running energy consumption index of the train in the current section according to the displacement and a traction force of the train at each time step;

obtaining a punctuality index of the train in the current section according to the displacement, an acceleration, the average speed of the train at each time step and the running time of the train in the current section; and obtaining a comfort index of the train in the current section according to the acceleration and running time of the train at each time step;

determining constraint conditions of the objective function according to speed limit information of the line and running time of the train in the current section;

solving the objective function according to the constraint conditions based on a differential evolution algorithm to obtain the target operation speed cure of the train; and issuing the obtained target operation speed curve of the train to the ATO of the train so that the ATO of the train controls the train to run in the current section according to the target operation speed curve.

2. The method for optimizing a target operation speed curve in the ATO of the train of claim 1, wherein the plurality of performance indexes include:

the running energy consumption index and the comfort index when a current passenger volume of the line is less than a preset threshold; or the punctuality index and the comfort index when the current passenger volume of the line is equal to or greater than the preset threshold;

wherein the running energy consumption index reflects an energy consumption when the train runs;

wherein the comfort index is measured by an impact rate of acceleration when the train runs; and wherein the comfort index is measured by an impact rate of acceleration when the train runs; and wherein the punctuality index reflects an arrival punctuality of the train.

3. The method for optimizing a target operation speed curve in the ATO of the train of claim 2, wherein the running energy consumption index of the train in the current section is obtained according to the displacement and the traction force of the train at each time step by a first equation:

$$E_1 = \sum_{i=1}^{T} F_i s_i$$

wherein $E_1$ is the running energy consumption index of the train in the current section, T is a number of time steps, $F_i$ is the traction force of the train at the i-th time step, and $s_i$ is the displacement of the train at the i-th time step;

wherein the punctuality index of the train in the current section is obtained according to the displacement, the acceleration, the average speed of the train at each time step and the running time of the train in the current section by a second equation:

$$E_2 = \sum_{i=1}^{T} \left[ \left( \sqrt{2a_i(s_{i+1} - s_i) + v_i^2} - v_i \right) / a_i \right] - t_0$$

wherein $E_2$ is the punctuality index of the train in the current section, $a_i$ is the acceleration of the train at the i-th time step, $s_{i+1}$ is the displacement of the train at the i+1-th time step, $v_i$ is the average speed of the train at the i-th time step, and $t_0$ is the running time of the train in the current section in the running timetable; and wherein the comfort index of the train in the current section is obtained according to the acceleration and time of the train at each time step by a third equation:

$$E_3 = \sum_{i=1}^{T} \frac{|a_i - a_{i-1}|}{\Delta t_i}$$

wherein $E_3$ is the comfort index of the train in the current section, $a_{i-1}$ is the acceleration of the train at the i-1-th time step, and $\Delta t_i$ is the time at the i-th time step.

4. The method for optimizing a target operation speed curve in the ATO of the train of claim 3, wherein the constructing the objective function for optimizing the target operation speed curve of the train according to the plurality of performance indexes comprises:

constructing an objective function $J_1$ when the current passenger volume of the line is less than the preset threshold according to:

$J_1 = \min(w_1 E_1 + w_2 E_3)$ wherein $J_1$ represents the objective function, $E_1$ is the running energy consumption index of the train in the current section, $E_3$ is the comfort index of the train in the current section, and $w_1$ and $w_2$ are a weight of the running energy consumption index and a weight of the comfort index, respectively; or constructing an objective function $J_2$ when the current passenger volume of the line is equal to or greater than the preset threshold according to:

$J_2 = \min(w_3 E_2 + w_4 E_3)$ wherein $J_2$ represents the objective function, $E_2$ is the punctuality index of the train in the current section, $E_3$ is the comfort index of the train in the current section, and $w_3$ and $w_4$ are a weight of the punctuality index and a weight of the comfort index, respectively.

5. The method for optimizing a target operation speed curve in the ATO of the train of claim 3, wherein the determining constraint conditions of the objective function according to the speed limit information of the line and running time of the train in the current section comprises:

querying a speed limit value of the current section from the speed limit information of the line, and determining that one of the constraint conditions of the objective function is that the target operation speed curve of the train running in the current section is less than the speed limit value; and obtaining the running time of the train in the current section from the running timetable of the train, and determining that one of the constraint conditions of the objective function is that the running time of the train in the current section according to the target operation speed curve is less than the product of the running time of the train in the current section in the running timetable and a preset multiple.

6. The method for optimizing a target operation speed curve in the ATO of the train of claim 2, wherein the constructing the objective function for optimizing the target operation speed curve of the train according to the plurality of performance indexes comprises:

constructing an objective function $J_1$ when the current passenger volume of the line is less than the preset threshold according to:

$$J_1 = \min(w_1 E_1 + w_2 E_3)$$

wherein $J_1$ represents the objective function, $E_1$ is the running energy consumption index of the train in the current section, $E_3$ is the comfort index of the train in the current A section, and $w_1$ and $w_2$ are a weight of the running energy consumption index and a weight of the comfort index, respectively; or constructing an objective function $J_2$ when the current passenger volume of the line is equal to or greater than the preset threshold according to:

$$J_2 = \min(w_3 E_2 + w_4 E_3)$$

wherein $J_2$ represents the objective function, $E_2$ is the punctuality index of the train in the current section, $E_3$ is the comfort index of the train in the current section, and $w_3$ and $w_4$ are a weight of the punctuality index and a weight of the comfort index, respectively.

7. The method for optimizing a target operation speed curve in the ATO of the train of claim 2, wherein the determining constraint conditions of the objective function according to the speed limit information of the line and running time of the train in the current section comprises:

querying a speed limit value of the current section from the speed limit information of the line, and determining that one of the constraint conditions of the objective function is that the target operation speed curve of the train running in the current section is less than the speed limit value; and obtaining the running time of the train in the current section from the running timetable of the train, and determining that one of the constraint conditions of the objective function is that the running time of the train in the current section according to the target operation speed curve is less than the product of the running time of the train in the current section in the running timetable and a preset multiple.

8. The method for optimizing a target operation speed curve in the ATO of the train of claim 1, wherein the determining constraint conditions of the objective function according to the speed limit information of the line and running time of the train in the current section comprises:

querying a speed limit value of the current section from the speed limit information of the line, and determining that one of the constraint conditions of the objective function is that the target operation speed curve of the train running in the current section is less than the speed limit value; and obtaining the running time of the train in the current section from the running timetable of the train, and determining that one of the constraint conditions of the objective function is that the running time of the train in the current section according to the target operation speed curve is less than the product of the running time of the train in the current section in the running timetable and a preset multiple.

9. An electronic device, comprising a memory, a processor, and computer programs stored in the memory and executable by the processor, wherein the processor is configured to implement steps of the method for optimizing the target operation speed curve in the ATO of the train of claim 1 when executing the computer programs.

10. An electronic device, comprising a memory, a processor, and computer programs stored in the memory and executable by the processor, wherein the processor is configured to implement steps of the method for optimizing the target operation speed curve in the ATO of the train of claim 2 when executing the computer-programs.

11. A non-transitory computer-readable storage medium, in which computer programs are stored, wherein steps of the method for optimizing the target operation speed curve in the ATO of the train of claim 1 are implemented when the computer programs are executed by a processor.

12. A non-transitory computer-readable storage medium, in which computer programs are stored, wherein steps of the method for optimizing the target operation speed curve in the ATO of the train of claim 2 are implemented when the computer programs are executed by a processor.

13. A device for optimizing a target operation speed curve in an Automatic Train Operation (ATO) of a train, comprising:

a constructor configured to calculate a plurality of performance indexes of the train driving in a current section of a line, and construct an objective function for optimizing the target operation speed curve of the train according to the plurality of performance indexes, the constructor configured to calculate the plurality of performance indexes by:

obtaining a running time of the train in the current section of a line from a running timetable of the train;

dividing the running time into a plurality of time steps and obtaining a displacement of the train at each time step according to an average speed of the train at each time step;

obtaining a running energy consumption index of the train in the current section according to the displacement and a traction force of the train at each time step;

obtaining a punctuality index of the train in the current section according to the displacement, an acceleration, the average speed of the train at each time step and the running time of the train in the current section; and obtaining a comfort index of the train in the current section according to the acceleration and running time of the train at each time step;

a determiner configured to determine constraint conditions of the objective function according to speed limit information of the line and running time of the train in the current section;

a solver configured to solve the objective function according to the constraint conditions based on a differential evolution algorithm to obtain the target operation speed curve of the train, the ATO of the train receiving the obtained target operation speed curve of the train to control the train to run in the current section according to the target operation speed curve.

14. The device of claim 13, wherein the plurality of performance indexes include:
- the running energy consumption index and the comfort index when a current passenger volume of the line is less than a preset threshold; or
- the punctuality index and the comfort index when the current passenger volume of the line is equal to or greater than the preset threshold;
- wherein the running energy consumption index reflects an energy consumption when the train runs;
- wherein the comfort index is measured by an impact rate of acceleration when the train runs; and
- wherein the punctuality index reflects an arrival punctuality of the train.

15. The device of claim 14, wherein the objective function for optimizing the target operation speed curve of the train according to the plurality of performance indexes comprises:
- an objective function $J_1$ when the current passenger volume of the line is less than the preset threshold according to:

$$J_1 = \min(w_1 E_1 + w_2 E_3)$$

wherein $J_1$ represents the objective function, $E_1$ is the running energy consumption index of the train in the current section, $E_3$ is the comfort index of the train in the current section, and $w_1$ and $w_2$ are a weight of the running energy consumption index and a weight of the comfort index, respectively; or
- an objective function $J_2$ when the current passenger volume of the line is equal to or greater than the preset threshold according to:

$$J_2 = \min(w_3 E_2 + w_4 E_3)$$

wherein $J_2$ represents the objective function, $E_2$ is the punctuality index of the train in the current section, $E_3$ is the comfort index of the train in the current section, and $w_3$ and $w_4$ are a weight of the punctuality index and a weight of the comfort index, respectively.

16. The device of claim 13, wherein the running energy consumption index of the train in the current section is obtained according to the displacement and the traction force of the train at each time step by a first equation:

$$E_1 = \sum_{i=1}^{T} F_i s_i$$

wherein $E_1$ is the running energy consumption index of the train in the current section, T is a number of the time steps, $F_i$ is the traction force of the train at the i-th time step, and $s_i$ is the displacement of the train at the i-th time step;

wherein the punctuality index of the train in the current section is obtained according to the displacement, the acceleration, the average speed of the train at each time step and the running time of the train in the current section by a second equation:

$$E_2 = \sum_{i=1}^{T} \left[ \left( \sqrt{2 a_i (s_{i+1} - s_i) + v_i^2} - v_i \right) / a_i \right] - t_0$$

wherein $E_2$ is the punctuality index of the train in the current section, $a_i$ is the acceleration of the train at the i-th time step, $s_{i+1}$ is the displacement of the train at the 1+1-th time step, $v_i$ is the average speed of the train at the i-th time step, and $t_0$ is the running time of the train in the current section in the running timetable; and wherein the comfort index of the train in the current section is obtained according to the acceleration and time of the train at each time step by a third equation:

$$E_3 = \sum_{i=1}^{T} \frac{|a_i - a_{i-1}|}{\Delta t_i}$$

wherein $E_3$ is the comfort index of the train in the current section, $a_{i-1}$ is the acceleration of the train at the i-1-th time step, and $\Delta t_i$ is the time at the i-th time step.

17. The device for optimizing the target operation speed curve in the ATO of the train of claim 13, wherein the determining constraint conditions of the objective functions according to the speed limit information of the line and running time of the train in the current section comprises:
- querying a speed limit value of the current section from the speed limit information of the line, and determining that one of the constraint conditions of the objective function is that the target operation speed curve of the train running in the current section is less than the speed limit value; and
- obtaining the running time of the train in the current section from the running timetable of the train, and determining that one of the constraint conditions of the objective function is that the running time of the train in the current section according to the target operation speed curve is less than the product of the running time of the train in the current section in the running timetable and a preset multiple.

18. The device of claim 13, wherein the constructor comprises a memory, a processor, and a computer program stored in the memory and executable by the processor, wherein the processor executes a software to calculate the plurality of performance indexes of the train driving in the current section of the line, and construct the objective function for optimizing the target operation speed curve of the train according to the plurality of performance indexes.

19. The device of claim 13, wherein the determiner comprises a memory, a processor, and a computer program stored in the memory and executable by the processor, wherein the processor executes a software to determine constraint conditions of the objective function according to speed limit information of the line and running time of the train in the current section.

20. The device of claim 13, wherein the solver comprises a memory, a processor, and a computer program stored in the memory and executable by the processor, wherein the processor executes a software to solve the objective function according to the constraint conditions based on the differential evolution algorithm to obtain the target operation speed curve of the train.

* * * * *